Aug. 18, 1964     H. W. THIELFOLDT     3,144,682

EXTRUDER

Filed Sept. 22, 1961

INVENTOR.
HENRY W. THIELFOLDT
BY *Gillette & Virgil*

ATTORNEYS

3,144,682
EXTRUDER

Henry W. Thielfoldt, Suffolk County, N.Y., assignor, by mesne assignments, to Owens-Illinois Glass Company, Toledo, Ohio, a corporation of Ohio
Filed Sept. 22, 1961, Ser. No. 140,078
6 Claims. (Cl. 18—14)

This invention relates to an improved system for varying the wall thickness of an extruded deformable material which may be used in manufacturing blown bottles of thermoplastic material.

In the manufacture of thermoplastic bottles, a polymeric material such as polyethylene is used. The thermoplastic material may be first extruded into a cylindrical form and then placed into a mold where it is blown by means of a gas, such as air, so that the wall of the cylinder is forced to expand against the inner walls of the mold which are in the shape of a bottle. When the cylinder has a substantially uniform thickness, in some instance, it is found that the thickness of the cylinder is less than is required to accommodate the amount of expansion required to form a bottle of acceptable wall thickness. To overcome the disadvantage mentioned above, various techniques have been suggested heretofore for this purpose, but unfortunately for one reason or another they are not entirely satisfactory.

An object of this invention is to provide a system for producing a thermoplastic extrudate of varying wall thickness.

Another object is to provide a system whereby extrudates of different wall thickness can be manufactured in the same apparatus.

Other objects and advantages of this invention will become apparent from the following description and explanation thereof.

Figure 1:
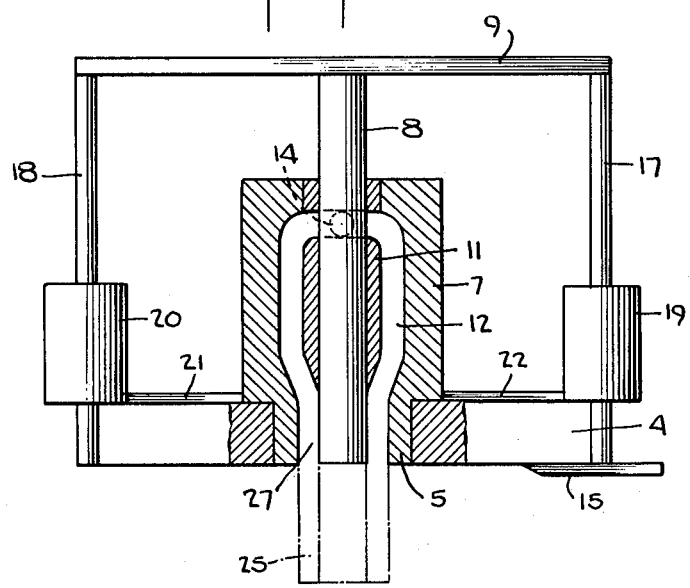
Figure 2:
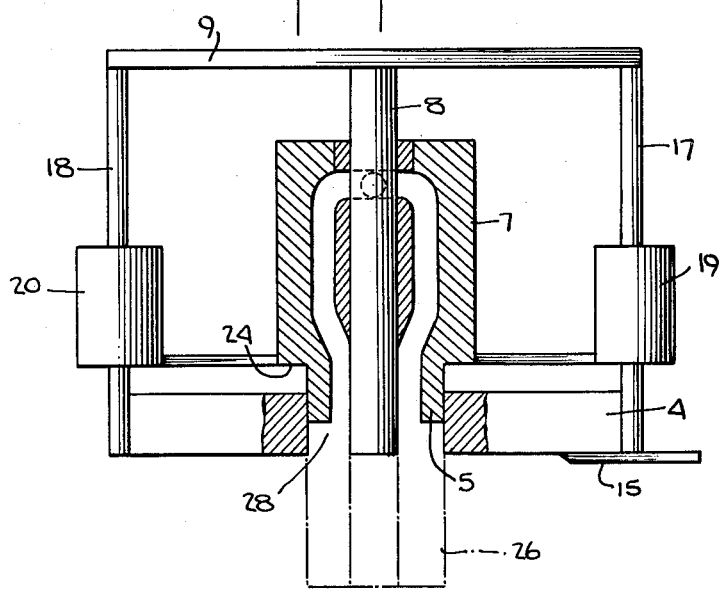

For a fuller understanding reference will be had to the accompanying drawings which form a part of this specification and wherein:

FIGURE 1 is an example of the extruder of the present invention, which is shown partly in cross-section, and functioning to produce a thin walled extrudate; and FIGURE 2 is the same as FIGURE 1 except that the extruder is functioning to produce an extrudate of relatively greater wall thickness.

The extruder forming the present invention is useful for producing extrudates of any size and shape, and a common feature to all uses is that by proper adjustment of the extruder mechanism the wall thickness of the extrudate can be changed. Consequently, the heat or pressure deformable material to be used in the present invention may be synthetic or natural in origin, such as thermoplastic materials, e.g., polyethylene and the like. The present extruder is particularly adapted for producing extrudates which are utilized in making deformable bottles and the like, however, the extrudate can be specially prepared for any purpose, provided it is desired that the wall thickness be varied.

In the drawings, the extruder contains a stationary extrusion die ring 4. The stationary die ring 4 contains an inner concentrically disposed movable extrusion die ring 5 which is arranged for vertical reciprocal movement. The movable die ring 5 has its outer wall in close fit with the inner wall of the stationary ring 4 and its inner diameter determines the size of the outside diameter of the extrudate produced by the extrusion process. The movable die ring 5 is integrally formed with an extrusion cross-head 7 which is positioned above the die ring 5. The cross-head 7 circumscribes an extrusion core pin 8. The core pin 8 is in turn dependent from a lift cross-member 9 and is centered within the entire vertical height of the cross-head 7 and the movable die ring 5. The core pin 8 contains a core pin threader 11 which circumscribes a substantial part of the core pin 8 which is positioned within the cross-head 7. The cross-head 7 contains an internal inverted pear shaped cavity, which together with the core pin spreader 11 form an annular passageway or feed chamber 12 for the flow of material to the movable die ring 5. The deformable material is fed into the feed chamber 12 from a supply outlet 14. At the underside of the stationary die ring is positioned a knife 15 for cutting the extrudates to desired length.

The lift cross-member 9 is supported by vertical members 17 and 18, each positioned to the side of the cross-head 7. The vertical members 17 and 18 are each anchored or fastened to the side of the stationary die ring 4 in diametrically opposed positions. The vertical members 17 and 18 carry pneumatic lift cylinders 19 and 20 respectively and the lift cylinders are capable of sliding up and down on the members 17 and 18. When actuated the lift cylinders 19 and 20 which in this example are driven by air, cause the cross-head 7 to be lifted by reason of lower lift cross members 21 and 22. The cross-head 7 slides on the core pin 8 causing the movable die ring 5 to be raised. When the movable die ring 5 is in a raised position, part of the inner wall of the stationary die ring 4 is exposed and the usefulness of this arrangement will be explained in greater detail below.

Referring to FIGURE 2, it is shown that the lift cylinders 19 and 20 have lifted the cross-head 7 so that the movable die ring 5 is about half way out of the stationary die ring 4. In this position, it can be seen that where the movable die ring 5 joins the cross-head 7 exists an inside shoulder 24 which is adapted to rest on the stationary die ring when the cross-head 7 is at its lowermost position. By comparing FIGURE 1 and FIGURE 2, the extrudate 25 of the former has a thinner wall than the extrudate 26 of the latter. The thickness of the extrudate can be varied within a single piece or the entire extrudate can be made thicker or thinner in wall thickness to meet production requirements.

In operation, plastic material is charged through the supply outlet 14 and flows through feed chamber 12. Thereafter the material is forced through the annular passageway 27 between the core pin 8 and the movable die ring 5. If the movable die ring 5 is in the position shown in FIGURE 1, the extrudate 25 has the thinner wall. When it is desired to change the wall thickness, the pneumatic cylinders are actuated, causing them to slide upwardly on vertical members 17 and 18 and thus carrying with them cross-head 7 which rides on core pin 8. In a raised position, the annular passageway 28 between the core pin 8 and stationary die ring 4 determines the wall thickness of the extrudate 26.

It is contemplated modifying the system described above to provide that the die ring 4 would be movable relative to the inner die ring 5, or that both rings can be moved simultaneously or sequentially.

I claim:

1. An extruder comprising a first hollow die member having a cylindrical inner wall; a second hollow die member having a cylindrical outer wall contiguous with the cylindrical inner wall of said first die member; a pin member projecting into said die members at least to a plane coinciding with the bottom face of said first die member and positioned concentrically within said second die member and spaced therefrom to form an annular zone therewith, means for supplying plastic material to said annular zone; and means for moving one of said die members relative to the other to raise the end of said second die member above said plane to vary the thickness of extruded plastic material.

2. The extruder of claim 1 wherein the second die member is capable of moving relative to the first die member and thereby forming an annular zone between the first die member and the pin member.

3. The extruder of claim 1 wherein the die members are die rings.

4. An extruder comprising: a first hollow die ring having a cylindrical inner wall; a second hollow die ring having a cylindrical outer wall contiguous with the cylindrical inner wall of said first die ring; a cylindrical pin projecting into said die rings at least to a plane coinciding with the bottom face of said first die ring and positioned concentrically within said second die ring and spaced therefrom to form an annular passage therewith; a supply head forming an integral part of said second die ring, said supply head having an aperture through which said pin extends whereby said supply head is free to move up and down on said pin while maintaining close contact therewith, said supply head having an inner cavity which forms a second annular passage with said pin that interconnects with said first annular passage; means for supplying material to said second annular passage; and means for lifting and lowering said supply head while extrudate is emerging from the extruder, whereby the wall thickness of the extrudate may be increased at will by moving said supply head to a raised position.

5. The extruder of claim 4 being further characterized by the pin member having its upper end fastened to a cross member, the cross member being supported by a vertical supporting member at each end thereof, the supply head member being connected to the vertical supporting members intermediate of the same, and lifting means whereby the supply head member is raised and lowered.

6. The extruder of claim 5 wherein the lifting means comprises pneumatic cylinders being carried in each vertical supporting members.

References Cited in the file of this patent

UNITED STATES PATENTS

| | | |
|---|---|---|
| 2,044,961 | Waner | June 23, 1936 |
| 2,632,202 | Haines | Mar. 24, 1953 |
| 2,750,625 | Colombo | June 19, 1956 |
| 2,780,835 | Sherman | Feb. 12, 1957 |
| 3,019,481 | Negoro | Feb. 6, 1962 |
| 3,023,461 | Sherman | Mar. 6, 1962 |

FOREIGN PATENTS

| | | |
|---|---|---|
| 1,025,834 | France | Apr. 20, 1953 |
| 752,056 | Great Britain | July 4, 1956 |
| 603,517 | Canada | Aug. 16, 1960 |